United States Patent
Kamo

[19]

[11] Patent Number: 5,808,812
[45] Date of Patent: Sep. 15, 1998

[54] ZOOM LENS SYSTEM

[75] Inventor: Yuji Kamo, Hino, Japan

[73] Assignee: Olympus Optical Co., Ltd., Tokyo, Japan

[21] Appl. No.: 758,091

[22] Filed: Nov. 27, 1996

[30] Foreign Application Priority Data

Nov. 29, 1995 [JP] Japan ................................. 7-332511

[51] Int. Cl.$^6$ .................................................. G02B 15/14
[52] U.S. Cl. ......................................... 359/692; 359/717
[58] Field of Search ................................ 359/692, 717

[56] References Cited

U.S. PATENT DOCUMENTS

| | | | |
|---|---|---|---|
| 4,818,081 | 4/1989 | Ito | 359/692 |
| 5,126,884 | 6/1992 | Sato | 359/692 |
| 5,162,947 | 11/1992 | Ito | 359/692 |
| 5,353,163 | 10/1994 | Shibayama et al. | 359/692 |
| 5,386,321 | 1/1995 | Kawamura | 359/692 |
| 5,418,647 | 5/1995 | Ishisaka | 359/692 |
| 5,585,971 | 12/1996 | Itoh | 359/692 |
| 5,666,233 | 9/1997 | Ogata | 359/692 |

FOREIGN PATENT DOCUMENTS

| | | |
|---|---|---|
| 5-113537 | 5/1993 | Japan. |
| 6-347696 | 12/1994 | Japan. |
| 7-181382 | 7/1995 | Japan. |
| 7-261078 | 10/1995 | Japan. |

*Primary Examiner*—Georgia Y. Epps
*Assistant Examiner*—Evelyn A. Lester
*Attorney, Agent, or Firm*—Cushman Darby & Cushman IP Group of Pillsbury Madison & Sutro

[57] ABSTRACT

A zoom lens system composed, in order from the object side, of a first positive lens unit and a second negative lens unit, and configured to change a magnification thereof by varying an airspace reserved between the first lens unit and the second lens unit. The first lens unit is composed, in order from the object side, of a first negative lens element, a second plastic lens element which has at least one aspherical surface and a remarkably weak refractive power, and a cemented lens component consisting of a third negative lens element and a fourth positive lens element.

24 Claims, 5 Drawing Sheets

ZOOM LENS SYSTEM

BACKGROUND OF THE INVENTION

1. Field of the Invention

The present invention relates to a zoom lens system which has a short back focal length and a high vari-focal ratio, is suited for use with lens shutter cameras and can be manufactured at a low cost.

2. Description of Related Art

It is demanded nowadays to obtain a compact zoom lens system for lens shutter cameras which has a high vari-focal ratio and can be manufactured at a low cost. However, it is necessary to use an aspherical lens element for configuring a zoom lens system of this kind while maintaining its optical performance. Even when the aspherical lens element is made of a glass material which is expensive however, it is not always possible to unconditionally lower a manufacturing cost of the zoom lens system by reducing the number of lens elements used in the lens system. It is therefore conceivable to lower the manufacturing cost by using an aspherical lens element made of a plastic material which is inexpensive.

However, a plastic material has a defect that its shape and refractive index vary with changes of temperature and humidity. Accordingly, a focal length of a lens element made of a plastic material is changed due to environmental variations, thereby deviating a focal plane of a lens system which uses this lens system.

As a lens which has corrected this defect, there is known a lens system disclosed by Japanese Patent Kokai Publication No. Hei 5-113537 which was developed by the inventor. This is a zoom lens system which consists of two lens units, can be manufactured at a low cost and is configured to reduce a deviation of its focal plane by selecting a remarkably weak refractive power for a lens element made of a plastic material so as to reduce influences on the plastic lens element due to variations of temperature and humidity.

In addition, a lens system disclosed by Japanese Patent Kokai Publication No. Hei 6-347696 is known as another conventional example configured for the similar purposes.

Further, under the current circumstances where zoom lens systems having zoom ratios slightly lower than 3 are demanded, the inventor developed a zoom lens system disclosed by Japanese Patent Kokai Publication No. Hei 7-181382 which has a composition similar to that of the lens system disclosed by the above-mentioned Japanese Patent Kokai Publication No. Hei 5-113537. Furthermore, the inventor proposed a zoom lens system disclosed by Japanese Patent Application No. Hei 6-51716 (Japanese Patent Kokai Publication No. Hei 7-261078) as a lens system having higher optical performance.

Out of the conventional examples mentioned above, the zoom lens system disclosed by Japanese Patent Kokai Publication No. 5-113537 is configured taking into consideration the influences on a plastic lens element due to temperature variations, but has a vari-focal ratio of 1.5 to 2.2 which is not so high.

The zoom lens system disclosed by Japanese Patent Kokai Publication No. Hei 7-181382 has a high vari-focal ratio, but has coma which is not corrected completely at marginal portions and cannot be said to be sufficient in optical performance thereof.

The zoom lens system disclosed by Japanese Patent Application No. Hei 6-51716 corrects aberrations more favorably by modifying, into a negative lens element, the plastic lens elements which have weak refractive powers in the lens system disclosed by the above-mentioned Japanese Patent Kokai Publication No. Hei 7-181382, but uses a plastic lens element having a refractive power, thereby having optical performance influenced due to variations of temperature and humidity.

SUMMARY OF THE INVENTION

A primary object of the present invention is to provide a zoom lens system which comprises an aspherical lens element made of a plastic material, can be manufactured at a low cost, has a high vari-focal ratio and high optical performance, and allows no deviation of a focal plane thereof due to variations of temperature and humidity.

The zoom lens system according to the present invention is characterized in that it is composed, in order from the object side, of a first lens unit having a positive refractive power, and a second lens unit having a negative refractive power. The zoom that lens system has a magnification which is changed by varying an airspace reserved between the first lens unit and the second lens unit. The first lens unit is composed, in order from the object side, of a first negative lens element, a second plastic lens element which has at least one aspherical surface and a remarkably weak refractive power, and a cemented lens component consisting of a third negative lens element and a fourth positive lens element, and the lens system satisfies the following conditions (1) and (2):

$$40 < v_1 < 75 \quad (1)$$

$$40 < v_2 < 95 \quad (2)$$

DETAILED DESCRIPTION OF THE PREFERRED EMBODIMENTS

Figure 1:
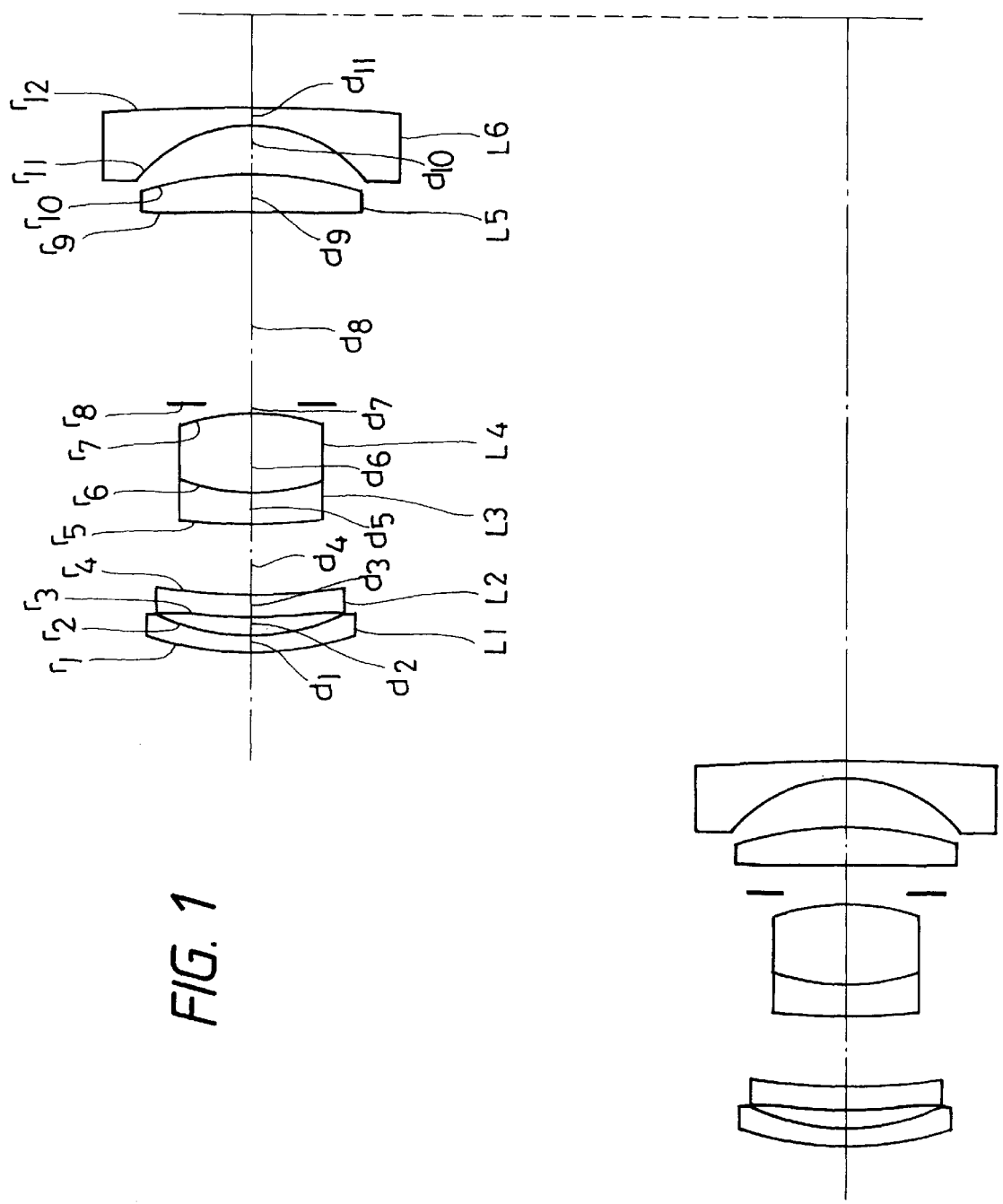
FIGS. 1 through 5 show sectional views illustrating compositions of first through fifth embodiments respectively of the zoom lens system according to the present invention.

The zoom lens system according to the present invention is characterized in that it has a composition as shown in FIG. 1, for example, or is composed, in order from the object side, of a first lens unit having a positive refractive power and a second lens unit having a negative refractive power. The lens system is configured to change a magnification thereof by varying an airspace reserved between the first lens unit and the second lens unit. The first lens unit is composed of a first negative lens element $L_1$, a second plastic lens element $L_2$ which has at least one aspherical surface and a remarkably weak refractive power, and a cemented lens component consisting of a third negative lens element $L_3$ and a fourth positive lens element $L_4$. The first lens unit satisfies the following conditions (1) and (2):

$$40 < v_1 < 75 \quad (1)$$

$$40 < v_2 < 95 \quad (2)$$

wherein the reference symbol $v_1$ represents an Abbe's number of the first lens element $L_1$ and the reference symbol $v_2$ designates an Abbe's number of the second lens element $L_2$.

Out of the zoom lens systems disclosed by the above-mentioned Japanese patents Kokai Publication No. Hei 5-113537 and No. Hei 7-181382 proposed by the inventor, the former is a zoom lens system which has a vari-focal ratio slightly lower than 2 and is composed of a small number of lens elements, whereas the latter is a zoom lens system which has a vari-focal ratio slightly lower than 3 and is composed of a small number of lens elements. Each of these zoom lens systems uses a first lens unit which is composed, in order from the object side, of a plastic lens element having a weak refractive power, a negative lens element and a positive lens element or a plastic lens element, and a cemented lens component consisting of a negative lens element and a positive lens element.

In the first lens unit of each of these zoom lens systems, spherical aberration and coma are produced in large amounts by an image side surface of the positive lens element and these aberrations are corrected with an aspherical surface of the plastic lens element having the weak refractive power. Since aberrations remaining in the first lens unit are magnified by a second lens unit, it is required to strictly correct these aberrations when the zoom lens system has a high vari-focal ratio.

However, these aberrations cannot be corrected completely with the aspherical surface of the plastic lens element that has the weak refractive power. Accordingly, the zoom lens system disclosed by the above-mentioned Japanese Patent Application No. Hei 6-51716 is configured to correct these aberrations with a plastic lens element having a negative refractive power. In a fundamental composition, this zoom lens system is composed, in order from the object side, of a negative plastic lens element, a negative lens element and a positive lens element or a negative plastic lens element, and a cemented lens component consisting of a negative lens element and a positive lens element. Though this zoom lens system has optical performance enhanced by adopting the fundamental composition, the optical performance is influenced by variations of temperature and humidity due to the fact that the plastic lens element has a negative refractive power as described above.

The negative plastic lens element used in the first lens unit of the lens system disclosed by the above-mentioned Japanese Patent Application is divided into a negative glass lens element and a plastic lens element having a weak refractive power in the zoom lens system according to the invention for sufficient correction of aberrations, and the composition described above is selected for this zoom lens system to prevent a focal plane thereof from being deviated due to variations of temperature and humidity. Further, chromatic aberration must be sufficiently corrected so that little remains in the first lens unit when the zoom lens system is to have a high vari-focal ratio, and it is therefore necessary to configure a first lens element $L_1$ and a second lens element $L_2$ so as to produce chromatic aberration in small amounts. For this reason, the first lens element $L_1$ and the second lens element $L_2$ are configured to have Abbe's numbers satisfying the above-mentioned conditions (1) and (2) so as to produce chromatic aberration in a small amount.

If the upper limit of 75 of the condition (1) is exceeded, the first lens element will require a high material cost contrary to the object of a low manufacturing cost of the present invention. If the lower limit of 40 of the condition (1) is exceeded, in contrast, chromatic aberration will be produced in a large amount, thereby degrading optical performance of the zoom lens system. If the upper limit of 95 of the condition (2) is exceeded, there will be no material available for the second lens element or this lens element cannot be manufactured in practice. If the lower limit of 40 of the condition (2) is exceeded, chromatic aberration will be produced in a large amount, thereby remarkably degrading optical performance of the zoom lens system.

Though a zoom lens system preferred as a first embodiment of the zoom lens system disclosed by the above-mentioned Japanese Patent Kokai Publication No. Hei 6-347696 uses a first lens unit which is composed of a negative lens element, a plastic lens element, and a cemented lens component consisting of a negative lens element and a positive lens element like the first lens unit of the zoom lens system according to the present invention, the plastic lens element is made of polycarbonate which cannot satisfy the above-mentioned condition (2) and poses a problem of birefringence. Further, the first lens element and the second lens element of the first embodiment are made of a material which has a high dispersing power and does not satisfy the condition (1) or (2), thereby posing a problem for correction of chromatic aberration or a problem for enhancement of vari-focal ratio in particular.

The problem of birefringence can be solved by selecting, for the second lens element $L_2$ which is made of a plastic material, a material such as an acrylic, polyolefinic or amorphous fluoric resin material which satisfies the above-mentioned condition (2) and is commercially available. Further speaking of the second lens element $L_2$ which is made of a plastic material and has the weak refractive power in the zoom lens system according to the present invention, it is desirable to configure this lens element so as to have a focal length $f_{L2}$ satisfying the following condition (3):

$$|f_1/(f_{L2} \cdot z)| < 0.07 \qquad (3)$$

wherein the reference symbol $f_1$ represents a focal length of the first lens unit and the reference symbol z designates a vari-focal ratio.

As the zoom lens system according to the present invention has a higher vari-focal ratio, its focal plane is more apt to be deviated due to deformation of the second lens element $L_2$ which is caused due to variations of temperature and humidity. The condition (3) is required for reducing the deviation of the focal plane due to variation of temperature and humidity even when the zoom lens system has a high vari-focal ratio.

If the condition (3) is not satisfied, the deviation of the focal plane will undesirably be caused when the zoom lens system has a higher vari-focal ratio.

When the zoom lens system according to the present invention has a high vari-focal ratio, aberrations will be varied due to deformation of lens surfaces, thereby causing variations of a location of an optimum image point, i.e., a focal plane at a tele position in particular.

For preventing the focal plane from being varied, it is desirable that the second lens element $L_2$ satisfies the following condition (4):

$$|f_T(n_2-1)[1/r_3(P)-1/r_4(P)]| < 0.60 \qquad (4)$$

wherein the reference symbol $f_T$ represents a focal length of the zoom lens system as a whole at the tele position, the reference symbol $n_2$ designates a refractive index of the second lens element for the d-line, and the reference symbols $r_3(P)$ and $r_4(P)$ denote local radii of curvature on an object side surface and an image side surface respectively of the second lens element, of which the former is given by the formula shown below:

$$r_3(P) = Yt_3/\sin \phi_3$$

wherein the reference symbol $Yt_3$ represents a height of an axial marginal ray on the object side surface of the second lens element at the tele position and the reference symbol $\phi_3$ designates a value given by the following formula:

$$\phi_3 = \tan^{-1}[Yt_3^3/r_3(Q)\{1-(K_3+1)Yt_3^2/r_3(Q)^2\}^{-\frac{1}{2}} + 4A_{34}Yt_3^3 + 6A_{36}Yt_3^5 + 8A_{38}Yt_3^{7+\cdots}]$$

wherein the reference symbol $r_3(Q)$ represents an axial radius of curvature on the object side surface of the second lens element, the reference symbol $k_3$ designates a conical coefficient, and the reference symbols $A_{34}$, $A_{36}$, $A_{38}$, . . . denote aspherical surface coefficients.

The local radius of curvature $r_4(P)$ on the image side surface of the second lens element is also expressed by a formula similar to that shown above using a height of the axial marginal ray on this surface at the tele position, an axial radius of curvature, a conical coefficient and aspherical surface coefficients. When it is assumed that s is a parameter which has a value of 3 or 4, it is possible to express the local radii of curvature as follows:

$$r_s(P) = Yt_s/\sin \phi_s$$

$$\phi_s = \tan^{-1} [Yt_s/r_s(Q)\{1-(K_s+1)Yt_s^2 r_s(Q)^2\}^{-\frac{1}{2}} + 4A_{s4}Yt_s^3 + 6A_{s6}Yt_s^5 + 8A_{s8}Yt_s^7 + \ldots]$$

A value of $\phi$ mentioned above represents an angle formed between a normal to an aspherical surface and an optical axis at a location of the height of the axial marginal ray at the tele position, and the condition (4) means that the second lens element has a weak local refractive power for the axial marginal ray.

If the second lens element $L_2$ does not satisfy the condition (4), aberrations will be remarkably varied due to variations of temperature and humidity, thereby causing the deviation of the focal plane.

Since aberrations are produced in large amounts by an emergence side surface of the fourth lens element $L_4$ of the first lens unit in the zoom lens system according to the present invention, it is desirable to select a high refractive index and large radii of curvature for this lens element. For this reason, it is desirable to configure the fourth lens element $L_4$ so as to satisfy the following condition (5):

$$1.55 < n_4 < 1.75 \quad (5)$$

wherein the reference symbol $n_4$ represents a refractive index of the fourth lens element $L_4$ for the d-line.

If the upper limit of 1.75 of the condition (5) is exceeded, aberrations will be produced in small amounts, but the fourth lens element will require a high material cost contrary to the object of the present invention to reduce a manufacturing cost. Further, a Petzval's sum will have a large negative value, thereby degrading optical performance for marginal rays. If the lower limit of 1.55 of the condition (5) is exceeded, spherical aberration and coma will be aggravated, thereby degrading optical performance of the zoom lens system.

For reducing astigmatic difference, it is effective to thicken the fourth lens element $L_4$. Thickening the fourth lens element $L_4$ brings about another merit to displace a principal point of the first lens unit toward the object side, thereby allowing a stop to have a small diameter.

For the reason described above, it is desirable to configure the fourth lens element $L_4$ so as to have thickness satisfying the following condition (6):

$$0.35 < d_6/f_{L4} < 0.85 \quad (6)$$

wherein the reference symbol $d_6$ represents thickness of the fourth lens element $L_4$ and the reference symbol $f_{L4}$ designates a focal length of the fourth lens element.

If the upper limit of 0.85 of the condition (6) is exceeded, the zoom lens system will have a large total length. If the lower limit of 0.35 of the condition (6) is exceeded, in contrast, astigmatic difference will be remarkable and a stop will have a large diameter, thereby making the zoom lens system noncompact.

For the zoom lens system according to the present invention, it is desirable to distribute, in order from the object side, a positive refractive power and a negative refractive power in the second lens unit. When the second lens unit is composed, in order from the object side, of a positive lens element and a negative lens element, in particular, the zoom lens system has high optical performance and can be manufactured at a low cost. That is to say, it is desirable to compose the second lens unit of a fifth positive lens element $L_5$ and a sixth negative lens element $L_6$ as shown in FIG. 1.

For correcting chromatic aberration, astigmatism and coma in the second lens unit, it is desirable to configure the fifth lens element $L_5$ so as to satisfy the following condition (7):

$$-4.5 < f_{L5}/f_2 < -1.5 \quad (7)$$

wherein the reference symbol $f_2$ represents a focal length of the second lens unit and the reference symbol $f_{L5}$ designates a focal length of the fifth lens element $L_5$.

If the upper limit of −1.5 of the condition (7) is exceeded, the sixth negative lens element $L_6$ will have too strong a refractive power, whereby astigmatism and coma cannot be corrected sufficiently. If the lower limit of −4.5 of the condition (7) is exceeded, in contrast, the fifth positive lens element will have too weak a refractive power, whereby chromatic aberration cannot be corrected.

For correcting astigmatism and coma, it is effective to use an aspherical surface as an object side surface of the fifth lens element $L_5$.

Now, the preferred embodiments of the zoom lens system according to the present invention will be described.

First through fifth embodiments of the zoom lens system according to the present invention have numerical data which is listed below:

First embodiment f = 39.33~63.13~101.33, F number 4.66~6.63~9.21
$f_b$ = 8.62~31.73~68.83, ω = 28.23°~18.68°~12.01°

$r_1$ = 27.6322
   $d_1$ = 1.5000                       $n_1$ = 1.69680   $\nu_1$ = 55.53
$r_2$ = 18.1887
   $d_2$ = 1.7690
$r_3$ = 30.7710 (aspherical surface)
   $d_3$ = 2.0000                       $n_2$ = 1.49241   $\nu_2$ = 57.66
$r_4$ = 34.4125 (aspherical surface)
   $d_4$ = 6.3900
$r_5$ = 47.9248
   $d_5$ = 3.0342                       $n_3$ = 1.84666   $\nu_3$ = 23.78
$r_6$ = 20.1108
   $d_6$ = 7.3682                       $n_4$ = 1.60729   $\nu_4$ = 49.19
$r_7$ = −17.7621
   $d_7$ = 1.0000
$r_8$ = ∞ (stop)
   $d_8$ = $D_1$ (variable)
$r_9$ = −102.8261 (aspherical surface)
   $d_9$ = 3.6000                       $n_5$ = 1.57501   $\nu_5$ = 41.49
$r_{10}$ = −28.7961
   $d_{10}$ = 4.4758
$r_{11}$ = −12.5451
   $d_{11}$ = 1.6000                      $n_6$ = 1.69680   $\nu_6$ = 55.53
$r_{12}$ = −144.4459 aspherical surface coefficients (3rd surface)   K = −0.1639, $A_4$ = −1.3336 × $10^{-4}$,
                     $A_6$ = −2.0820 × $10^{-7}$, $A_8$ = −1.9217 × $10^{-9}$,
                     $A_{10}$ = 5.7442 × $10^{-11}$
(4th surface)   K = −0.0675, $A_4$ = −8.6345 × $10^{-5}$, -continued

```
                A_6 = 2.7806 × 10^-7, A_8 = -2.0476 × 10^-9,
                A_10 = 7.3824 × 10^-11,
(9th surface)   K = 0, A_4 = 3.4624 × 10^-5,
                A_6 = 1.0551 × 10^-7, A_8 = 1.9772 × 10^-9,
                A_10 = -1.1562 × 10^-11
f                39.33          63.13          101.33
D_1              17.20936       8.27679        2.71190
        ν_1 = 55.53, ν_2 = 57.66, |f_1/(f_L2 · z)| = 0.0241
        |f_T · (n_2 - 1) · [(1/r_3(P) - 1/r_4(P)]| = 0.222
        n_4 = 1.60729, d_6/f_L4 = 0.440, f_LS/f_2 = -2.218
```

Second embodiment

```
        f = 39.33~63.13~101.34, F number 4.66~6.63~9.21
        f_b = 6.78~28.70~63.89, ω = 28.22°~18.65°~12.01°
r_1 = 136.5028
        d_1 = 1.5000           n_1 = 1.71700    ν_1 = 47.94
r_2 = 61.1744
        d_2 = 2.3676
r_3 = 28.8644 (aspherical surface)
        d_3 = 2.0000           n_2 = 1.49241    ν_2 = 57.66
r_4 = 31.9817 (aspherical surface)
        d_4 = 5.4980
r_5 = 58.7607
        d_5 = 2.7639           n_3 = 1.78472    ν_3 = 25.68
r_6 = 23.9349
        d_6 = 7.8630           n_4 = 1.61405    ν_4 = 54.95
r_7 = -20.4334
        d_7 = 1.0000
r_8 = ∞ (stop)
        d_8 = D_1 (variable)
r_9 = -54.4405 (aspherical surface)
        d_9 = 3.6000           n_5 = 1.54814    ν_5 = 45.78
r_10 = -28.2114
        d_10 = 4.9106
r_11 = -11.1727
        d_11 = 1.6000          n_6 = 1.64000    ν_6 = 60.09
r_12 = -57.3074
``` aspherical surface coefficients

```
(3rd surface)   K = -0.1667, A_4 = -8.9113 × 10^-5,
                A_6 = -4.2061 × 10^-7, A_8 = 1.7940 × 10^-9,
                A_10 = -8.7827 × 10^-12
(4th surface)   K = 0, A_4 = -5.2036 × 10^-5,
                A_6 = -5.5691 × 10^-8, A_8 = 0, A_10 = 0
(9th surface)   K = 0, A_4 = 4.8932 × 10^-5,
                A_6 = -2.5441 × 10^-8, A_8 = 7.0566 × 10^-9,
                A_10 = -3.0351 × 10^-11
f                39.33          63.13          101.34
D_1              16.77940       8.11182        2.71190
        ν_1 = 47.94, ν_2 = 57.66, |f_1/(f_L2 · z)| = 0.0246
        |f_T · (n_2 - 1) · [1/r_3(P) - 1/r_4(P)]| = 0.130
        n_4 = 1.61405, d_6/f_L4 = 0.408, f_LS/f_2 = -3.530
```

Third embodiment

```
        f = 39.33~67.13~101.34, F number 4.66~6.63~9.21
        f_b = 7.95~30.56~66.87, ω = 28.22°~18.76°~12.03°
r_1 = -132.7912
        d_1 = 1.5000           n_1 = 1.56883    ν_1 = 56.33
r_2 = 90.1931
        d_2 = 0.4033
r_3 = 29.4529 (aspherical surface)
        d_3 = 2.0000           n_2 = 1.52542    ν_2 = 55.78
r_4 = 32.4134
        d_4 = 3.7812
r_5 = 61.0953
        d_5 = 1.8025           n_3 = 1.74077    ν_3 = 27.79
r_6 = 24.2944
        d_6 = 8.7754           n_4 = 1.58313    ν_4 = 59.38
r_7 = -17.0175
        d_7 = 1.0000
r_8 = ∞ (stop)
        d_8 = D_1 (variable)
r_9 = -56.0761 (aspherical surface)
        d_9 = 3.6000           n_5 = 1.57501    ν_5 = 41.49
r_10 = -28.9462
        d_10 = 5.1210
r_11 = -11.8338
        d_11 = 1.6000          n_6 = 1.69680    ν_6 = 55.53
r_12 = -56.2024
``` aspherical surface coefficients

```
(3rd surface)   K = -0.2219, A_4 = -6.5152 × 10^-5,
                A_6 = -3.0817 × 10^-7, A_8 = -2.6137 × 10^-9,
                A_10 = 1.5027 × 10^-11
(9th surface)   K = 0, A_4 = 4.1043 × 10^-5,
                A_6 = 7.8018 × 10^-8, A_8 = 3.4884 × 10-9,
                A_10 = -1.8860 × 10^-11
f                39.33          67.13          101.34
D_1              16.43180       7.97845        2.71190
        ν_1 = 56.33, ν_2 = 55.78, |f_1/(f_L2 · z)| = 0.0238
        |f_T · (n_2 - 1) · [1/r_3(P) - 1/r_4(P)]| = 0.347
        n_4 = 1.58313, d_6/f_L4 = 0.471, f_LS/f_2 = -3.428
```

Fourth embodiment

```
        f = 39.33~63.13~101.33, F number 4.66~6.63~9.21
        f_b = 8.54~31.87~69.33, ω = 28.24°~18.75°~12.03°
r_1 = -78.0893
        d_1 = 1.5000           n_1 = 1.69680    ν_1 = 55.53
r_2 = 92.6064
        d_2 = 1.0637
r_3 = 32.8797 (aspherical surface)
        d_3 = 2.0000           n_2 = 1.52542    ν_3 = 55.78
r_4 = 47.9914
        d_4 = 3.5699
r_5 = 50.4152
        d_5 = 1.5543           n_3 = 1.69895    V_3 = 30.12
r_6 = 20.7850
        d_6 = 8.3915           n_4 = 1.55963    ν_4 = 61.17
r_7 = -16.8185
        d_7 = 1.0000
r_8 = ∞ (stop)
        d_8 = D_1 (variable)
r_9 = -79.7721 (aspherical surface)
        d_9 = 3.6000           n_5 = 1.57501    ν_5 = 41.49
r_10 = -29.4877
        d_10 = 5.0006
r_11 = -12.8658
        d_11 = 1.6000          n_6 = 1.69680    ν_6 = 55.53
r_12 = -114.2598
``` aspherical surface coefficients

```
(3rd surface)   K = -0.2210, A_4 = -6.6980 × 10^-5,
                A_6 = -4.4024 × 10^-7, A_8 = 1.0971 × 10^-9,
                A_10 = -1.9995 × 10^-11
(9th surface)   K = 0, A_4 = 2.8264 × 10^-5,
                A_6 = 1.8416 × 10^-7, A_8 = 2.9069 × 10^-10,
                A_10 = -4.0933 × 10^-12
f                39.33          63.13          101.33
D_1              17.29752       8.31060        2.71190
        ν_1 = 55.53, ν_2 = 55.78, |f_1/(f_L2 · z)| = 0.063
        |f_T (n_2 - 1) · [1/r_3(P) - 1/r_4(P)[| = 0.296
        n_4 = 1.55963, d_6/f_L4 = 0.465, f_LS/f_2 = -3.786
```

Fifth embodiment

```
        f = 39.33~63.13~101.33, F number 4.66~6.63~9.21
        f_b = 7.02~28.12~61.99, ω = 28.18°~18.48°~11.96°
r_1 = 218.6092
        d_1 = 1.5000           n_1 = 1.71700    ν_1 = 47.94
r_2 = 83.7186
        d_2 = 0.4281
r_3 = 47.3604 (aspherical surface)
        d_3 = 2.0000           n_2 = 1.49241    ν_2 = 57.66
r_4 = 37.8779 (aspherical surface)
        d_4 = 5.4639
r_5 = 36.5431
        d_5 = 2.3818           n_3 = 1.78472    ν_3 = 25.68
r_6 = 18.6773
        d_6 = 7.6635           n_4 = 1.57250    ν_4 = 57.76
r_7 = -20.3218
        d_7 = 1.0000
r_8 = ∞ (stop)
        d_8 = D_1 (variable)
r_9 = -238.1067 (aspherical surface)
        d_9 = 3.6000           n_5 = 1.60342    ν_5 = 38.02
r_10 = -37.3898
        d_10 = 4.7899
```

-continued $r_{11} = -11.5102$
$d_{11} = 1.6000$     $n_6 = 1.64000$    $v_6 = 60.09$
$r_{12} = -180.3267$ aspherical surface coefficients (3rd surface)   $K = -0.1622, A_4 = -1.4090 \times 10^{-4}$,
                $A_6 = 2.0682 \times 10^{-8}, A_8 = 1.5115 \times 10^{-9}$,
                $A_{10} = -1.8310 \times 10^{-12}$
(4th surface)   $K = 0, A_4 = -1.0563 \times 10^{-4}$,
                $A_6 = 4.4081 \times 10^{-7}, A_8 = 0, A_{10} = 0$
(9th surface)   $K = 0, A_4 = 3.8031 \times 10^{-5}$,
                $A_6 = 2.5861 \times 10^{-7}, A_8 = 4.2503 \times 10^{-10}$,
                $A_{10} = 4.2809 \times 10^{-12}$

| | | | |
|---|---|---|---|
| f | 39.33 | 63.13 | 101.33 |
| $D_1$ | 16.94933 | 8.17692 | 2.71190 |

$v_1 = 47.94, v_2 = 57.66, |f_1/(f_{L2} \cdot z)| = 0.030$
$|f_T \cdot (n_2 - 1) \cdot [1/r_3(P) - 1/r_4(P)]| = 0.546$
$n_4 = 1.57250, d_6/f_{L4} = 0.419, f_{L5}/f_2 = -3.786$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of the respective lens elements. In addition, lengths such as focal lengths f are specified in millimeters.

Figure 2:
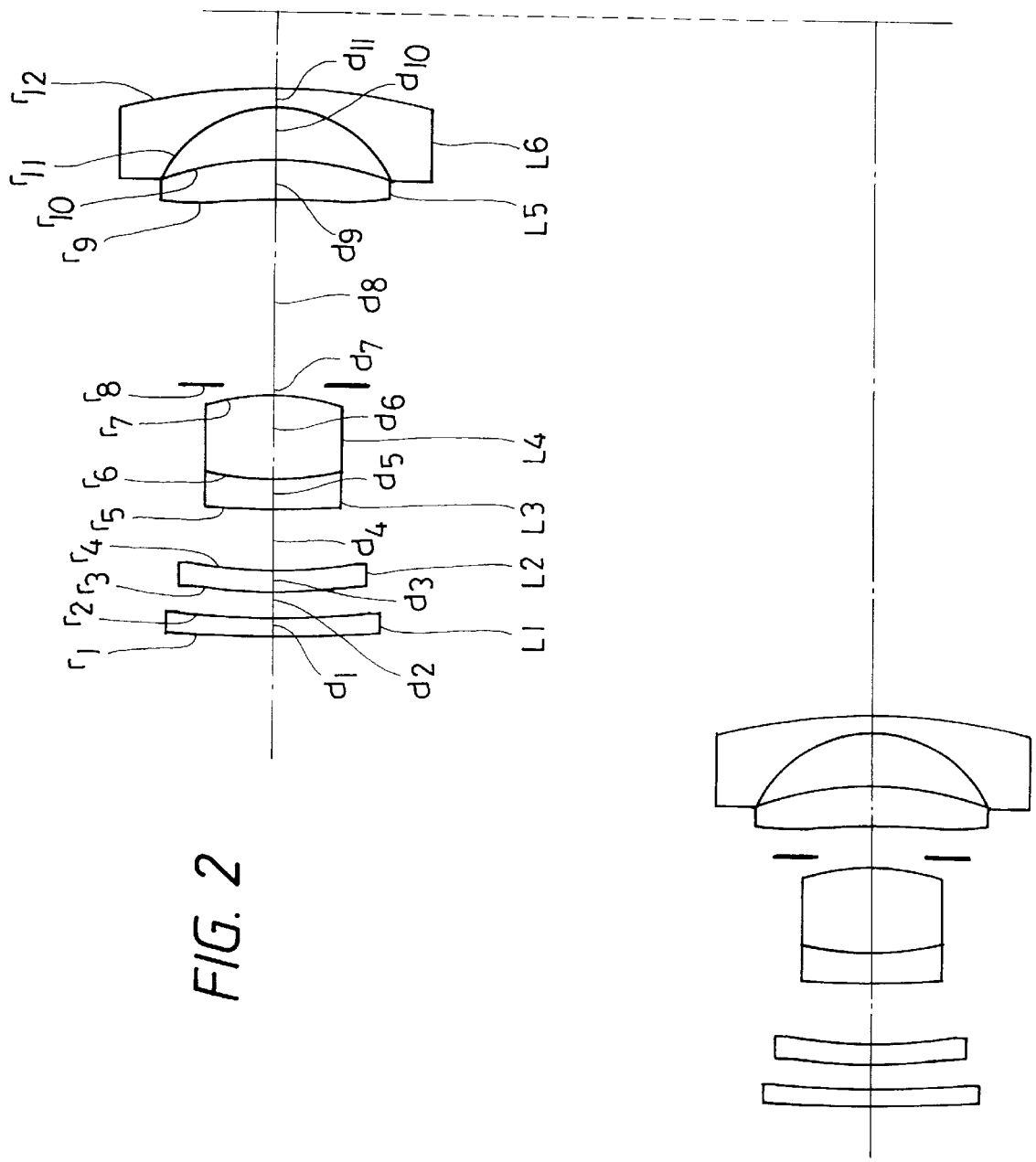
Figure 5:
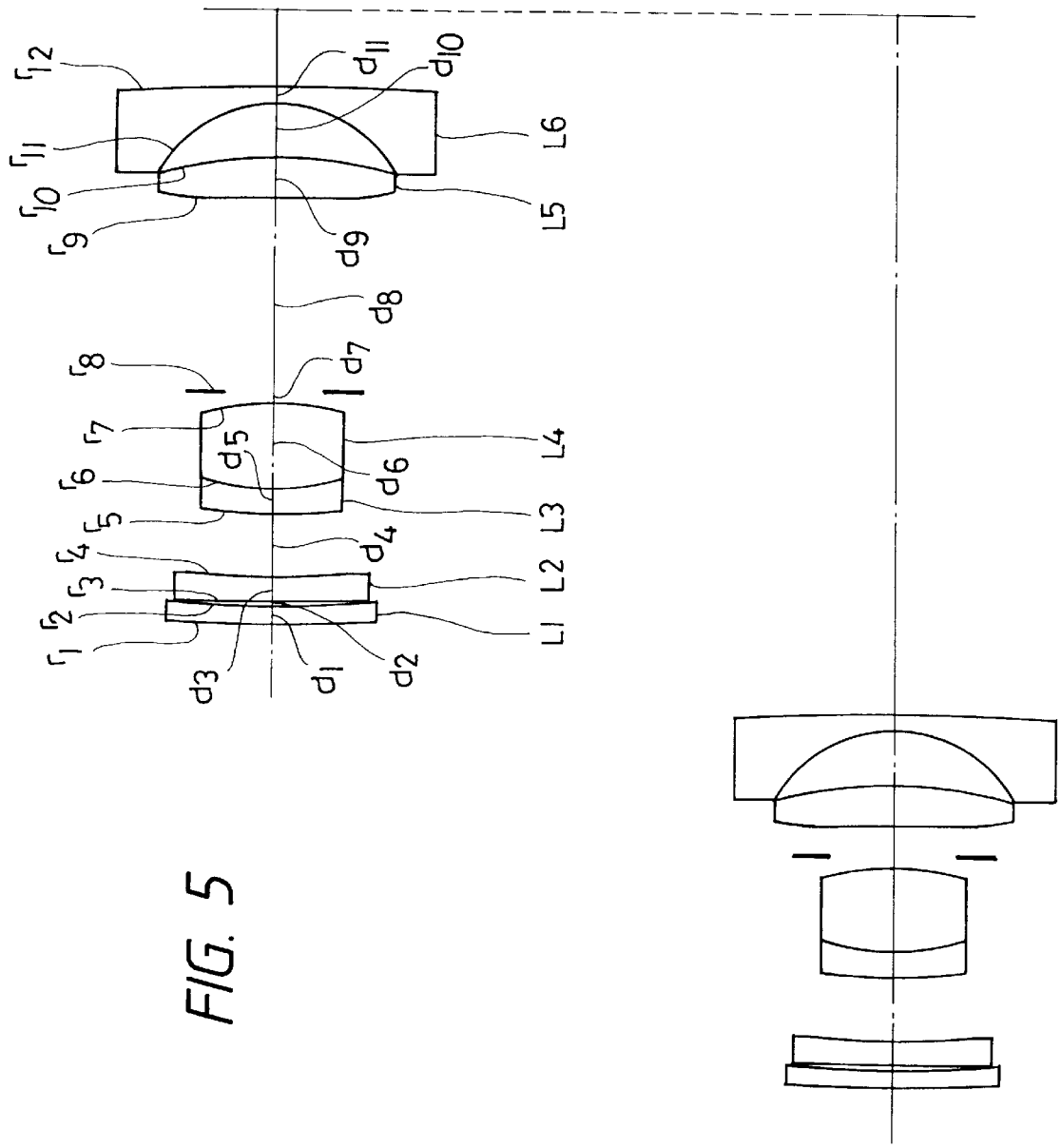

The first, second and fifth embodiments have compositions illustrated in FIG. 1, FIG. 2 and FIG. 5 respectively. Each of these embodiment is composed of a first lens unit having a positive refractive power and a second lens unit having a negative refractive power, and configured to change a magnification thereof by varying an airspace reserved between the first lens unit and the second lens unit. The first lens unit is composed, in order from the object side, of a first negative meniscus lens element $L_1$ having a convex surface on the object side, a second plastic lens element which has a convex surface on the object side, a remarkably weak refractive power and aspherical surfaces on both sides thereof, a third negative meniscus lens element $L_3$ having a convex surface on the object side and a fourth positive biconvex lens element $L_4$: the third lens element $L_3$ and the fourth lens element $L_4$ being cemented to each other for composing a cemented lens component. The second lens unit is composed of a fifth positive meniscus lens element $L_5$ which has an aspherical surface on the object side and a convex surface on the image side, and a sixth negative meniscus lens element $L_6$ having a convex surface on the image side. The second lens element $L_2$ is made of an acrylic material.

The zoom lens systems preferred as the first, second and fifth embodiments have focal lengths of 39.3 mm to 101.3 mm, a vari-focal ratio of 2.6 and F numbers of 4.66 to 9.21.

Figure 3:
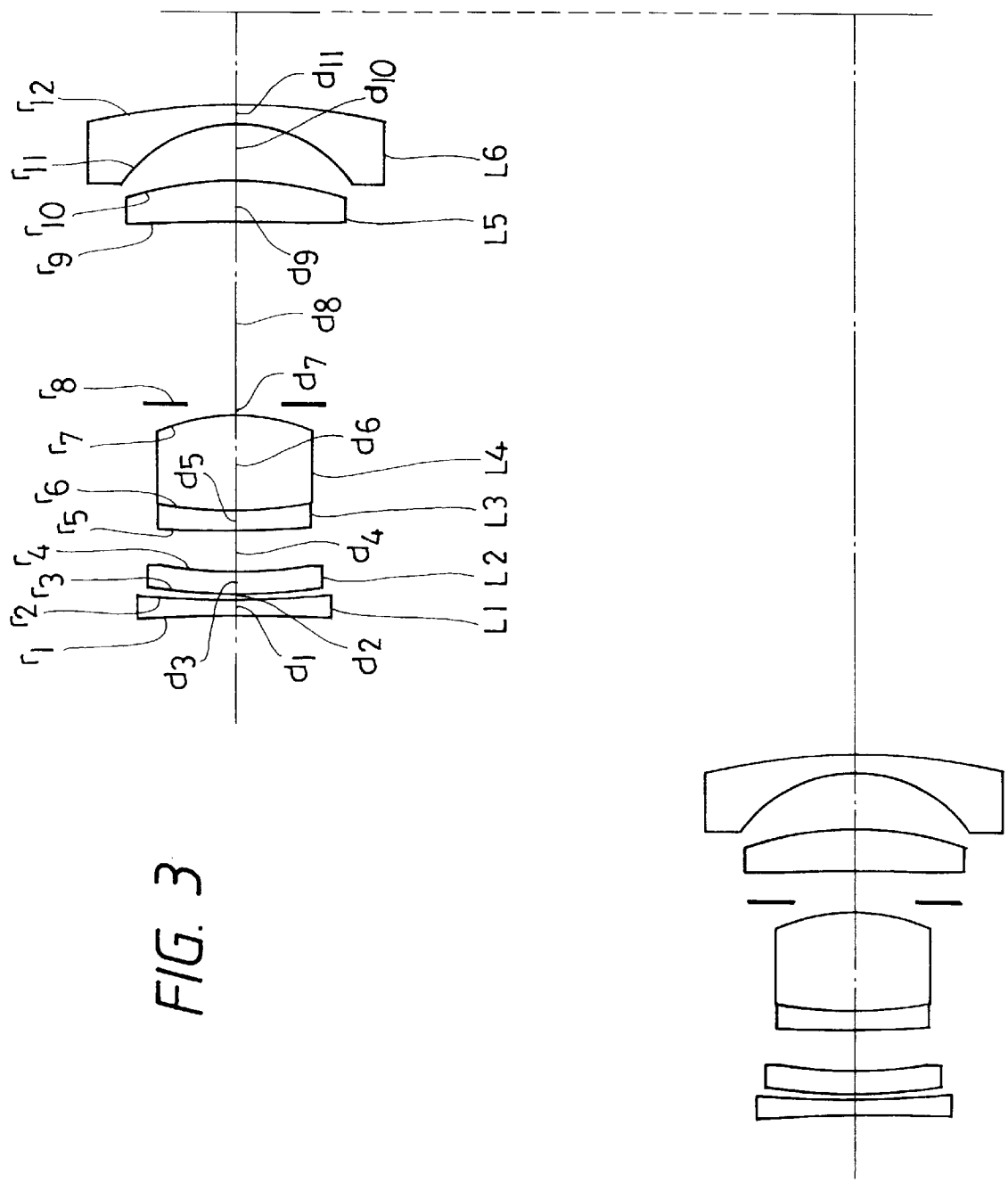
Figure 4:
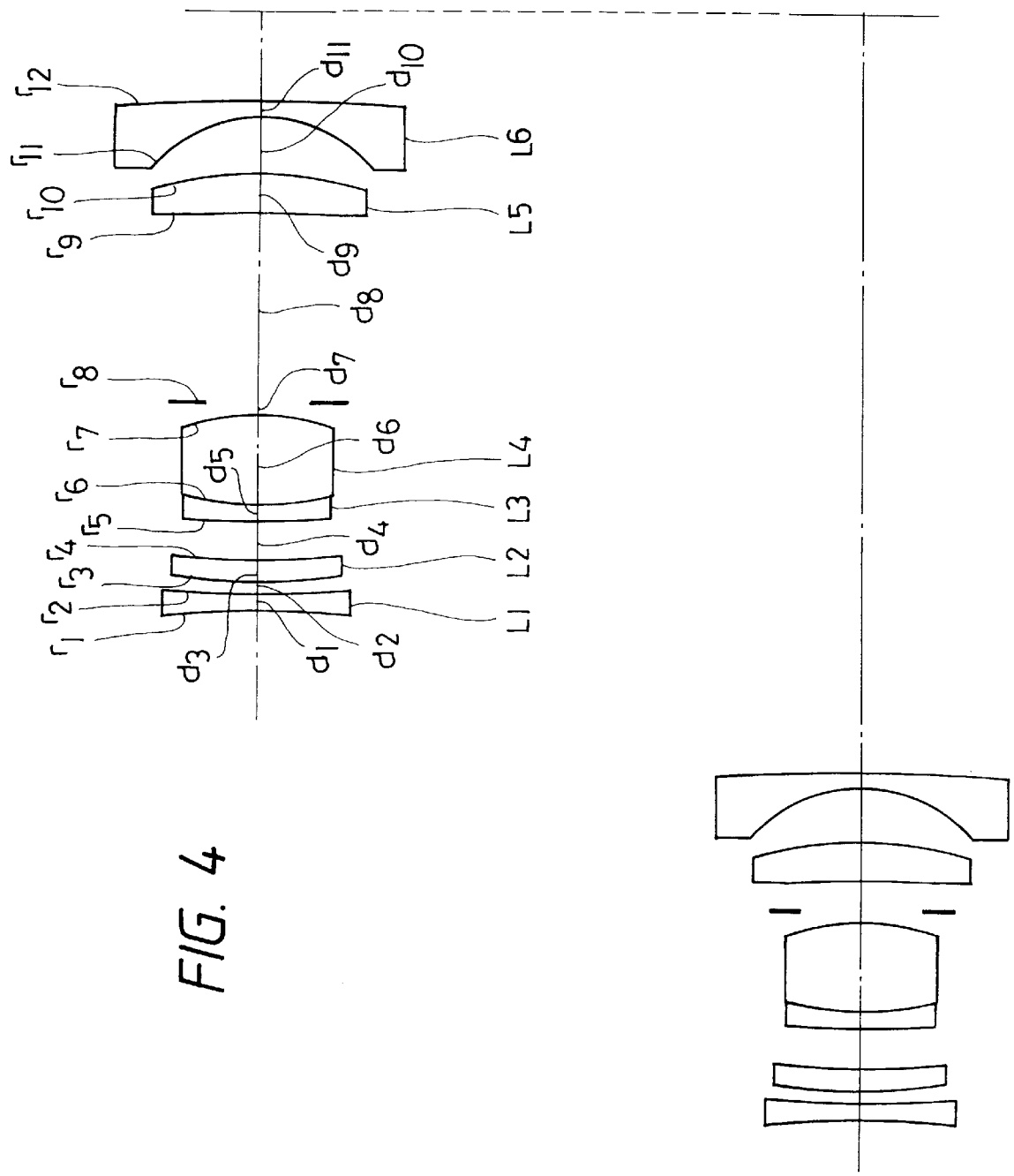

The third and fourth embodiments have compositions illustrated in FIG. 3 and FIG. 4 respectively. Each of these embodiment is a zoom lens system which is composed, in order from the object side, of a first lens unit having a positive refractive power and a second lens unit having a negative refractive power, and configured to change a magnification thereof by varying an airspace reserved between these lens units. Further, the first lens unit is composed, in order from the object side, of a first negative biconcave lens element $L_1$, a second plastic lens element $L_2$ which has a convex surface on the object side, a remarkably weak refractive power and an aspherical surface on the object side, a third negative element $L_3$ having a convex surface on the object side, and a fourth positive biconvex lens element $L_4$: the third lens element and the fourth lens element being cemented to each other to compose a cemented lens component. Furthermore, the second lens unit is composed of a fifth positive meniscus lens element $L_5$ which has an aspherical surface on the object side and a convex surface on the image side, and a sixth negative meniscus lens element $L_6$ which has a convex surface on the image side.

The second lens element $L_2$ used in each of the third and fourth embodiments is made of a polyolefinic material.

The third and fourth embodiments have focal length of 39.3 mm to 101.3 mm, a vari-focal ratio of 2.6 and F numbers of 4.66 to 9.21.

By selecting any one of the compositions described above, the present invention makes it possible to obtain a zoom lens system which has a high vari-focal ratio, can be manufactured at a low cost, and allows no deviation of a focal plane thereof due to variations of temperature and humidity.

I claim:

1. A zoom lens system comprising, in order from an object side:

a first lens unit having a positive refractive power; and a second lens unit having a negative refractive power, wherein said zoom lens system is configured to change a magnification thereof by varying an airspace reserved between said first lens unit and said second lens unit, said first lens unit comprises, in order from the object side, of a first negative lens element, a second plastic lens element which has at least one aspherical surface and a weak refractive power, and a cemented lens component consisting of a third negative lens element and a fourth positive lens element, and said first lens unit satisfies the following conditions (1) and (2):

$$40 < v1 < 75 \qquad (1)$$

$$40 < v2 < 95 \qquad (2)$$

wherein the reference symbols v1 and v2 represent Abbe's numbers of said first lens element and said second lens element respectively.

2. A zoom lens system according to claim 1 satisfying the following condition (3):

$$|f_1/(f_{L2} \cdot z)| < 0.07 \qquad (3)$$

wherein the reference symbol $f_1$ represents a focal length of said first lens unit, the reference symbol $f_{L2}$ designates a focal length of said second lens element and the reference symbol z denotes a vari-focal ratio.

3. A zoom lens system according to claim 1 or 2 satisfying the following condition (4):

$$|f_T(n_2-1)[1/r_3(P)-1/r_4(P)]| < 0.60 \qquad (4)$$

wherein the reference symbol $f_T$ represents a focal length of said zoom lens system as a whole at a tele position, the reference symbol $n_2$ designates a refractive index of said second lens element for the d-line, and the reference symbols $r_3(P)$ and $r_4(P)$ denote local radii of curvature on an object side surface and an image side surface respectively of said second lens element which are given by the following equations:

$$r_3(P) = Yt_3/\sin \phi_3$$

$$r_4(P) = Yt_4/\sin \phi_4$$

wherein the reference symbols $Yt_3$ and $Yt_4$ represent heights of an axial marginal ray on the object side surface and the image side surface respectively of said second lens element at a tele position, and the reference symbols $\phi_3$ and $\phi_4$ designate values which are given by the equations shown below:

$$\phi_3 = \tan^{-1}[Yt_3/r_3(Q)\{1-(K_3+1)Yt_3^2/r_3(Q)^2\}^{-\frac{1}{2}} + 4A_{34}Yt_3^3 + 6A_{36}Yt_3^5 + 8A_{38}Yt_3^7 + \ldots]$$

$$\phi_4 = \tan^{-1}[Yt_4/r_4(Q)\{1-(K_4+1)Yt_4^2/r_4(Q)^2\}^{-\frac{1}{2}} + 4A_{44}Yt_4^3 + 6A_{46}Yt_4^5 + 8A_{48}Yt_4^7 + \ldots]$$

wherein the reference symbols $r_3(Q)$ and $r_4(Q)$ represent axial radii of curvature on the object side surface and the image side surface respectively of said second lens element, the reference symbols $K_3$ and $K_4$ designate conical constants, and the reference symbols $A_{34}, A_{36}, A_{38}, \ldots$ and $A_{44}, A_{46}, A_{48}, \ldots$ denote aspherical surface coefficients.

4. A zoom lens system according to claim 1 satisfying the following condition (6):

$$0.35 < d_6/f_{L4} < 0.85 \qquad (6)$$

wherein the reference symbol $f_{L4}$ represents a focal length of said fourth lens element and the reference symbol $d_6$ designates a thickness of said fourth lens element.

5. A zoom lens system according to claim 1 wherein said second lens unit is composed, in order from the object side, of a single positive lens element and a single negative lens element.

6. A zoom lens system according to claim 1 satisfying the following condition (7):

$$-4.5 < f_{L5}/f_2 < -1.5 \qquad (7)$$

wherein the reference symbol $f_{L5}$ represents a focal length of said fifth lens element and the reference symbol $f_2$ designates a focal length of said second lens unit.

7. A zoom lens system according to claim 1 wherein an aspherical surface is used as an object side surface of the positive lens element disposed in said second lens unit.

8. A zoom lens system according to claim 1 satisfying the following condition (5):

$$1.55 < n_4 < 1.75 \qquad (5)$$

wherein the reference symbol $n_4$ represents a refractive index of said fourth lens element.

9. A zoom lens system comprising, in order from an object side:

a first lens unit having a positive refractive power; and
a second lens unit having a negative refractive power, wherein said zoom lens system is configured to change a magnification thereof by varying an airspace reserved between said first lens unit and said second lens unit,
said first lens unit comprises, in order from the object side, a first negative meniscus lens element having a convex surface on the object side, a second lens element which is made of a plastic material, and has a convex surface on the object side, at least one aspherical surface and a weak refractive power, a cemented lens component consisting of a third negative meniscus lens element having a convex surface on the object side and a fourth positive biconvex lens element,
said second lens unit is composed of a fifth positive meniscus lens element which has at least one aspherical surface and a convex surface on the image side, and a sixth negative meniscus lens element which has a convex surface on the image side, and
said first lens unit satisfies the following conditions (1) and (2):

$$40 < \nu_1 < 75 \qquad (1)$$

$$40 < \nu_2 < 95 \qquad (2)$$

wherein the reference symbols $\nu_1$ and $\nu_2$ represent Abbe's numbers of said first lens element and said second lens element, respectively.

10. A zoom lens system comprising, in order from an object side:

a first lens unit having a positive refractive power; and
a second lens unit having a negative refractive power, wherein said zoom lens system is configured to change a magnification thereof by varying an airspace reserved between said first lens unit and said second lens unit,
said first lens unit is composed, in order from the object side, of a first negative biconcave lens element, a second lens element which is made of a plastic material, and has a convex surface on the object side, at least one aspherical surface and a weak refractive power, and a cemented lens component consisting of a third negative meniscus lens element having a convex surface on the object side and a fourth positive biconvex lens element,
said second lens unit is composed of a fifth positive meniscus lens element which has at least one aspherical surface and a convex surface on the image side, and a sixth negative meniscus lens element which has a convex surface on the image side, and wherein said first lens unit satisfies the following conditions (1) and (2);

$$40 < \nu_1 < 75 \qquad (1)$$

$$40 < \nu_2 < 95 \qquad (2)$$

wherein the reference symbols $\nu_1$ and $\nu_2$ represent Abbe's numbers of said first lens element and said second lens element, respectively.

11. A zoom lens system according to claim 9 wherein said fifth lens element has an aspherical surface on the object side.

12. A zoom lens system according to claim 10 wherein said fifth lens element has an aspherical surface on the object side.

13. A zoom lens system according to claim 11 wherein said second lens element has an aspherical surface on the object side.

14. A zoom lens system according to claim 12 wherein said second lens element has an aspherical surface on the object side.

15. A zoom lens system according to claim 9 satisfying the following condition (3):

$$|f_1/(f_{L2} \cdot z)| < 0.07 \qquad (3)$$

wherein the reference symbol $f_1$ represents a focal length of said first lens unit, the reference symbol $f_{L2}$ designates a focal length of said second lens element and the reference symbol z denotes a vari-focal ratio.

16. A zoom lens system according to claim 9 or 15 satisfying the following condition (4):

$$|f_T \cdot (n_2-1)[1/r_3(P) - 1/r_4(P)]| < 0.60 \qquad (4)$$

wherein the reference symbol $f_T$ represents a focal length of said zoom lens system as a whole at the tele position, the reference symbol $n_2$ designates a refractive index of said second lens element for the d-line, and the reference symbols $r_3(P)$ and $r_4(P)$ denote local radii of curvature on an object side surface and an image side surface respectively of said second lens element which are given by the following equations:

$r_3(P) = Yt_3/\sin \phi_3$ $r_4(P) = Yt_4/\sin \phi_4$ wherein the reference symbols $Yt_3$ and $Yt_4$ represent heights of an axial marginal ray on the object side surface and the image side surface respectively of said second lens element at a tele position, and the reference symbols $\phi_3$ and $\phi_4$ designate values which are given by the equations shown below:

$\phi_3 = \tan^{-1}[Yt_3/r_3(Q)\{1-(K_3+1)Yt_3^2/r_3(Q)^2\}^{-1/2} + 4A_{34}Yt_3^3 + 6A_{36}Yt_3^5 + 8A_{38}Yt_3^7 + \ldots]$ $\phi_4 = \tan^{-1}[Yt_4/r_4(Q)\{1-(K_4+1)Yt_4^2/r_4(Q)^2\}^{-1/2} + 4A_{44}Yt_4^3 + 6A_{46}Yt_4^5 + 8A_{48}Yt_4^7 + \ldots]$ wherein the reference symbols $r_3(Q)$ and $r_4(Q)$ represent axial radii of curvature on the object side surface and the image side surface respectively of said second lens element, the reference symbols $K_3$ and $K_4$ designate conical constants, and the reference symbols $A_{34}, A_{36}, A_{38}, \ldots$ and $A_{44}, A_{46}, A_{48}, \ldots$ denote aspherical surface coefficients.

17. A zoom lens system according to claim 9 satisfying the following condition (6)

$$0.35 < d_6/f_{L4} < 0.85 \qquad (6)$$

wherein the reference symbol $f_{L4}$ represents a focal length of said fourth lens element and the reference symbol $d_6$ designates a thickness of said fourth lens element.

18. A zoom lens system according to claim 9 satisfying the following condition (7):

$$-4.5 < f_{L5}/f_2 < -1.5 \qquad (7)$$

wherein the reference symbol $f_{L5}$ represents a focal length of said fifth lens element and the reference symbol $f_2$ designates a focal length of said second lens unit.

19. A zoom lens system according to claim 10 satisfying the following condition (3):

$$|f_1/(f_{L2} \cdot z)| < 0.07 \qquad (3)$$

wherein the reference symbol $f_1$ represents a focal length of said first lens unit, the reference symbol $f_{L2}$ designates a focal length of said second lens element and the reference symbol z denotes a vari-focal ratio.

20. A zoom lens system according to claim 10 satisfying the following condition (4):

$$|f_T \cdot (n_2-1)[1/r_3(P)-1/r_4(P)]| < 0.60 \qquad (4)$$

wherein the reference symbol $f_T$ represents a focal length of said zoom lens system as a whole at the tele position, the reference symbol $n_2$ designates a refractive index of said second lens element for the d-line, and the reference symbols $r_3(P)$ and $r_4(P)$ denote local radii of curvature on an object side surface and an image side surface respectively of said second lens elements which are given by the equations shown below:

$r_3(P) = Yt_3/\sin \phi_3$ $r_4(P) = Yt_4/\sin \phi_4$ wherein the reference symbols $Yt_3$ and $Yt_4$ represent heights of an axial marginal ray on the object side surface and the image side surface respectively of said second lens element at a tele position, and the reference symbols $\phi_3$ and $\phi_4$ designate values which are given by the equations shown below:

$\phi_3 = \tan^{-1}[Yt_3/r_3(Q)\{1-(K_3+1)Yt_3^2/r_3(Q)^2\}^{-1/2} + 4A_{34}Yt_3^3 + 6A_{36}Yt_3^5 + 8A_{38}Yt_3^7 + \ldots]$ $\phi_4 = \tan^{-1}[Yt_4/r_4(Q)\{1-(K_4+1)Yt_4^2/r_4(Q)^2\}^{-1/2} + 4A_{44}Yt_4^3 + 6A_{46}Yt_4^5 + 8A_{48}Yt_4^7 + \ldots]$ wherein the reference symbols $r_3(Q)$ and $r_4(Q)$ represent axial radii of curvature on the object side surface and the image side surface respectively of said second lens element, the reference symbols $K_3$ and $K_4$ designate conical constants, and the reference symbols $A_{34}, A_{36}, A_{38}, \ldots$ and $A_{44}, A_{46}, A_{48}, \ldots$ denote aspherical surface coefficients.

21. A zoom lens system comprising, in order from an object side:

a first lens unit having a positive refractive power; and a second lens unit having a negative refractive power, wherein said zoom lens system is configured to change a magnification thereof by varying an airspace reserved between said first lens unit and said second lens unit, said first lens unit comprises, in order from the object side, a first negative biconcave lens element, a second lens element which is made of a plastic material, and has a convex surface on the object side, at lest one aspherical surface and a weak refractive power, and a cemented lens component consisting of a third negative meniscus lens element having a convex surface on the object side and a fourth positive biconvex lens element, said second lens unit is composed of a fifth positive meniscus lens element which has at least one aspherical surface and a convex surface on the image side, and a sixth negative meniscus lens element which has a convex surface on the image side, and said first lens unit satisfies the following conditions (1) and (2):

$$40 < v_1 < 75 \qquad (1)$$

$$40 < v_2 < 95 \qquad (2)$$

wherein the reference symbols $v_1$ and $v_2$ represent Abbe's numbers of said first lens element and said second lens element, respectively, and satisfying the following condition (6):

$$0.35 < d_6/f_{L4} < 0.85 \qquad (6)$$

wherein the reference symbol $f_{L4}$ represents a focal length of said fourth lens element and the reference symbol $d_6$ designates a thickness of said fourth lens element.

22. A zoom lens system according to claim 10 satisfying the following condition (7):

$$-4.5 < f_{L5}/f_2 < -1.5 \qquad (7)$$

wherein the reference symbol $f_{L5}$ represents a focal length of said fifth lens element and the reference symbol $f_2$ designates a focal length of said second lens unit.

23. A zoom lens system according to claim 9 or 10 satisfying the following condition (5):

$$1.55 < n_4 < 1.75 \qquad (5)$$

wherein the reference symbol $n_4$ represents a refractive index of the fourth lens element for the d-line.

24. A zoom lens system according to claim 1, 9 or 10, wherein said first lens element is made of glass.

* * * * *